US005815491A

United States Patent [19]
Guibert

[11] Patent Number: 5,815,491
[45] Date of Patent: Sep. 29, 1998

[54] METHOD AND APPARATUS FOR ADMITTING DATA TO A DIGITAL TELECOMMUNICATIONS NETWORK HAVING REGULATED ACCESS

[75] Inventor: Jacky Guibert, Issy les Moulineaux, France

[73] Assignee: France Telecom, Paris, France

[21] Appl. No.: 661,107

[22] Filed: Jun. 10, 1996

[30] Foreign Application Priority Data

Jun. 15, 1995 [FR] France ................................. 95 07144

[51] Int. Cl.⁶ .................................................. H04J 3/22
[52] U.S. Cl. ............................ 370/233; 370/234; 370/468
[58] Field of Search ................................. 370/233, 234, 370/395, 396, 397, 412, 468; 379/196; 375/202, 201

[56] References Cited

U.S. PATENT DOCUMENTS

| 5,179,556 | 1/1993 | Turner | 370/233 |
|---|---|---|---|
| 5,425,051 | 6/1995 | Mahany | 375/202 |
| 5,577,035 | 11/1996 | Hayter et al. | 370/395 |

FOREIGN PATENT DOCUMENTS

| 0381275 | 8/1990 | European Pat. Off. | H04L 12/56 |
|---|---|---|---|
| 0416685 | 3/1991 | European Pat. Off. | H04L 12/56 |

OTHER PUBLICATIONS

Roberts, J.W., Bensaou, B., Canetti, Y. —"A traffic control framework for high speed data transmission" —IFIP Transactions C–15 : Modelling and Performance Evaluation of ATM Technology, North Holland, 1993.

IEEE Infocom '93. The Conference on Computer Communications Proceedings. Twelfth Annual Joint Conference of the IEEE Computer and Communications Societies. Networking: Foundation for the Future (Cat. No. 93CH3264–9), San Francisco, CA, USA, 28 Mar.—ISBN 0–8186–3580–0, 1993, Los Alamitos, CA, USA, IEEE Comput, Soc. Press, USA, pp. 376–383 vol. 1, XP 000419753–Hartanto, V.F. et al., "User–network policer: a new approach for ATM congestion control".
*P. 378, right column, lines 1–3*.
*P. 379, left column, lines 26–29*.

*Primary Examiner*—Douglas W. Olms
*Assistant Examiner*—Shick Hom
*Attorney, Agent, or Firm*—Larson & Taylor

[57] ABSTRACT

For each of a plurality of sources, which has a peak transmission rate p, the cells coming from the source are stored in a FIFO access buffer memory; reserves ($R_1, \ldots, R_i, \ldots, R_n$) of tokens are allocated to the source, the reserves having respective determined token capacities ($M_1, \ldots, M_i, \ldots, M_n$) and replenishing at respective rates ($r_1, \ldots, r_i, \ldots, r_n$) verifying $r_1 > \ldots > r_i > \ldots > r_n$ and $$\frac{M_1}{p-r_1} < \ldots < \frac{M_i - M_{i-1}}{r_{i-1} - r_i} < \ldots < \frac{M_n - M_{n-1}}{r_{n-1} - r_n} ;$$

a first cell is sent as soon as each reserve contains a number of tokens that is at least equal to the length of the cell, at a transmission rate corresponding to the bandwidth of the network; all reserves are decremented by a number of tokens corresponding to the length of the cell; once the first reserve $R_1$ is exhausted, the message continues to be sent automatically at the replenishment rate $r_1$ until the second reserve $R_2$ is exhausted; and thereafter the message continues to be sent automatically at successive decreasing rates corresponding to the replenishment rates $r_2, \ldots, r_n$.

10 Claims, 2 Drawing Sheets

METHOD AND APPARATUS FOR ADMITTING DATA TO A DIGITAL TELECOMMUNICATIONS NETWORK HAVING REGULATED ACCESS

BACKGROUND OF THE INVENTION

The present invention relates to regulating or "policing" admission of data into a telecommunications network, by the "leaky bucket" algorithm or by the "credit manager" algorithm. More precisely, it relates to a method and to an apparatus for accepting data coming from a plurality of sources and admitting these data into a digital telecommunications network, while enabling the transmission rate of data gaining access to the network to be smoothed in parameterized and progressive manner, the peak transmission rates of the sources being often close to that of the network.

Mechanisms for regulating access are essential for proper operation of a telecommunications network. Among the numerous systems that have been studied, mention may be made of the so-called "leaky bucket" mechanism. That technique is described in CCITT Recommendation I.371, and it seems to be the most appropriate for digital networks. Its use has been recommended in various cases, for example those of Switched Multimegabit Data Services (SMDS), Metropolitan Area Networks (MAN), and the signalling network.

The prior art includes several "credit manager" apparatuses. A summary of existing "leaky bucket" and "credit manager" models is given by M. Lemercier in "Performance simulation of leaky buckets for ATM network access control", Modelling and Performance Evaluation of ATM Technology, IFIP North Holland, 1993. A credit manager apparatus is also described by J. W. Roberts, B. Bensaou and Y. Canetti in "A traffic control framework for high speed data transmission", IFIP Transactions C-15: Modelling and Performance Evaluation of ATM Technology, North Holland, 1993. It includes a single reserve capable of containing a predetermined maximum number M of tokens which are replenished at a predetermined rate r. A message is sent if and only if the reserve contains a number of tokens that is at least as great as the length of the message; in which case the tokens are taken from the reserve. If the number of available tokens is too small, then the message is not sent. That apparatus also includes an access buffer memory organized as a FIFO queue, in which incoming messages are stored. The first message present in the buffer is sent into the network at its arrival transmission rate for so long as the reserve is not empty, after which it is sent at a slower transmission rate that corresponds to the rate at which tokens are replenished. The contents of the above documents is included in the present application by way of reference.

A network user seeks to use the data transmission capabilities to the full at the maximum peak transmission rate. However, a variable rate digital source exhibits alternating behavior between periods of activity or "bursts" during which it is sending data at its peak transmission rate, and periods of inactivity or "silences". Such behavior is generally fairly well characterized by an on/off model at burst scale. If the volume of a burst exceeds the initial contents of the token reserve, then the final portion of the burst will be discarded. Once the reserve has been exhausted, the burst is subsequently carried over the network at no more than the rate r at which tokens are replenished.

In order to optimize sending capabilities, it is possible to manipulate the two parameters M and r. This can be referred to as "preventive" traffic control. A problem arises when bursts are of very different volumes, as is the case at the outlet from a local data network: the peak transmission rate of the source is significantly higher than the average rate, and as a result numerous bursts of volume greater than M suffer from a certain reduction of transmission rate while they are being sent, and therefore do not take advantage of the wide bandwidth offered to them by the network. If a high value is used for r, which means that a higher long term transmission rate r is acceptable, then economic profitability is lost. If the user is given a larger reserve M of tokens, then the advantage of a regulation mechanism is restricted since the source then sends nearly always at its peak transmission rate.

To avoid losing messages, it is necessary to provide an access buffer memory of appropriate size. If the buffer memory is too large, then it will be used in highly inefficient manner, whereas if it is too small, then numerous messages will be lost.

Proposals have also been made for "reactive" or feedback control, i.e. control that is adaptive, where the parameters M and r are modified in real time to take account of the non-predictable part of the characteristics of real traffic. However, in a high transmission rate network, such modification takes place too slowly and the delay it introduces corresponds to the duration of transmission of a very large volume of data, which is not acceptable.

SUMMARY OF THE INVENTION

An object of the present invention is to limit the above shortcomings by a method of traffic control in which regulation provides gentler smoothing of the transmission rate from each source having access to the network.

To achieve this object, the present invention provides a method for accepting data messages originating from a plurality of sources and each consisting of cells, and for admitting said messages into a digital telecommunications network, said method comprising the following steps, for each of said plurality of sources, which has a predetermined peak transmission rate p:

(a) allocating to said source a predetermined number n, n being an integer greater than 1, of reserves $R_1, \ldots, R_i, \ldots, R_n$ of tokens, each representing a time duration which is a fraction of a cell duration, and each of said reserves having a respective determined capacity of tokens $M_1, \ldots, M_i, \ldots, M_n$;

(b) replenishing said reserves at respective predetermined rates $r_1, \ldots, r_i, \ldots, r_n$, with $r_1 > \ldots > r_i > \ldots > r_n$ and such that:

$$\frac{M_1}{p - r_1} < \ldots < \frac{M_i - M_{i-1}}{r_{i-1} - r_i} < \ldots < \frac{M_n - M_{n-1}}{r_{n-1} - r_n},$$

i.e.

$$\frac{M_i - M_{i-1}}{r_{i-1} - r_i} < \frac{M_{i+1} - M_i}{r_i - r_{i+1}}$$

for all integers i lying in the range 1 to n−1, with $M_0 = 0$ and $r_0 = p$;

(c) storing the cells originating from said source in a FIFO access buffer memory;

(d) sending at least a first cell of a stored message from said access buffer memory as soon as each of said reserves contains a number of tokens that is at least equal to a length of said cell, at a higher transmission rate, and simultaneously decreasing all said reserves by a number of tokens that corresponds to the length of said cell;

(e) once a first one of said reserves $R_1$ is exhausted, continuing to send said message automatically at a second lower transmission rate equal to said rate $r_1$ of replenishment of said first reserve until the second reserve $R_2$ is exhausted; and (f) continuing to send said message automatically at successive decreasing transmission rates respectively equal to said replenishment rates $r_2, \ldots, r_n$.

The term "cell" should be interpreted broadly as covering any individualizable and identifiable block of data n digital form.

The reserves may be considered as being components that are disposed in parallel and that are replenished independently from one another. Their characteristic parameters (capacity M and replenishment rate r) are selected as a function of the characteristics of the network and as a function of the characteristics of the respective sources. Nevertheless, it is often advantageous to use simple implementations.

In a first case, M and r are so selected for the reserves corresponding to a common source that rates $r_1, \ldots, r_i, \ldots, r_n$ decrease in arithmetic progression and token capacities increase in geometric progression.

It is also possible to provide for the reserves of tokens that are disposed in parallel to have replenishment rates that decrease in geometric progression and token capacities that increase in arithmetic progression.

In many cases, and in particular for ATM networks associated with sources each constituted by a local data network, a good compromise consists in using four reserves of tokens. The replenishment rates $r_1$ to $r_4$ can constitute a decreasing arithmetic progression running from a first term h with a difference (d−h)/3, with d<h where h and d are predetermined constants, whereby:

$r_1 = h$ $r_2 = (2h+d)/3$ $r_3 = (h+2d)/3$ $r_4 = d$

However, the number of reserves may be different. As a general rule, it will lie in the range 2 to 6. When the network is an ATM type network, the messages are cells having a fixed length. When the network is a frame relay type network, the messages are packets of varying length.

In order to control the behavior of the source, the method of the present invention may comprise the steps of:

(g) defining a theoretical behavior for the source by means of a model including at least one parameter;

(h) measuring, at predetermined instants, said transmission rate at which cells are sent;

(i) checking whether a time series of said measured transmission rates is in conformity with said theoretical behavior, and, as long as it is not, (j) modifying said parameter and repeating steps (g)–(i).

In a particular embodiment, said theoretical behavior of the source is a fractal type behavior. Such behavior is defined herebelow.

The present invention also provides an apparatus for accepting data messages originating from a plurality of sources and each consisting of cells, and for admitting said messages into a digital telecommunications network, said apparatus comprising, for each of said plurality of sources, which has a predetermined peak transmission rate:

a buffer memory for access to said network, said access buffer memory being a FIFO access buffer memory and having an inlet which is connected to said source;

a predetermined number n, n being an integer lying in the range 2 to 6, of reserves of tokens $R_1, \ldots, R \ldots, R_n$ having respective determined token capacities $M_1, \ldots, M_i, \ldots, M_n$;

means for replenishing said reserves at predetermined rates $r_1, \ldots, r_i, \ldots, r_n$, with $r_1 > \ldots > r_i > \ldots > r_n$; and means responsive to a presence of at least one cell in said access buffer memory for determining whether each of said reserves contains a number of tokens that is at least equal to a length of said cell, for authorizing access by a first cell of a message stored in said buffer memory to said network at a transmission rate controlled by said network, while decrementing all said reserves by a number of tokens equal to the length of said cell, and then for sending subsequent cells at transmission rates respectively equal to said successive replenishment rates $r_1, \ldots, r_n$ as the reserves are exhausted.

Other features and advantages of the present invention will appear from the following detailed description of a particular embodiment given by way of non-limiting example. The description refers to the accompanying drawings.

DETAILED DESCRIPTION OF PREFERRED EMBODIMENTS

Figure 1:
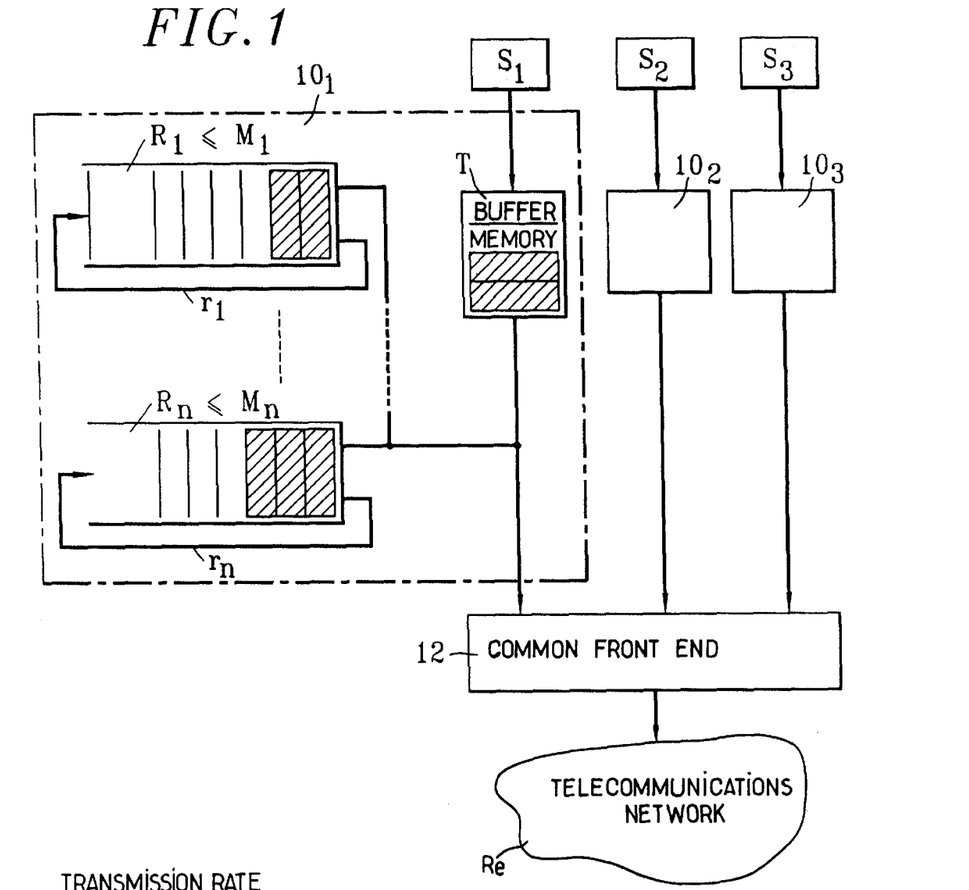
FIG. 1 is a block diagram of an apparatus constituting a particular embodiment of the present invention.

Referring to FIG. 1, a plurality of apparatuses $10_1$, $10_2$, $10_3$ are associated with respective sources $S_1$, $S_2$, $S_3$ which access a telecommunications network Re via a common front end 12. The apparatuses are of the same structure, so only apparatus $10_1$ is described in detail. It may be considered as having a number n of parallel-disposed reserves of tokens, together with a buffer memory T organized as a FIFO for access to network Re. At a given time, each reserve contains a running number $R_i$ of tokens, which is less than a maximum number $M_i$ of tokens, which is the capacity of the reserve; the tokens are regenerated at a specific rate $r_i$. A reserve can thus be represented by a token counter which is incremented by unity at a rate $r_i$.

Each reserve is replenished independently and in parallel with the other reserves. The replenishment algorithm has the following form:

```
repeat
|   wait 1/r_1
|   if R_1 < M_i
|   |   then F_i ← R_1 + 1
|   |   else nothing
|   end if
end repeat
```

Figure 2:
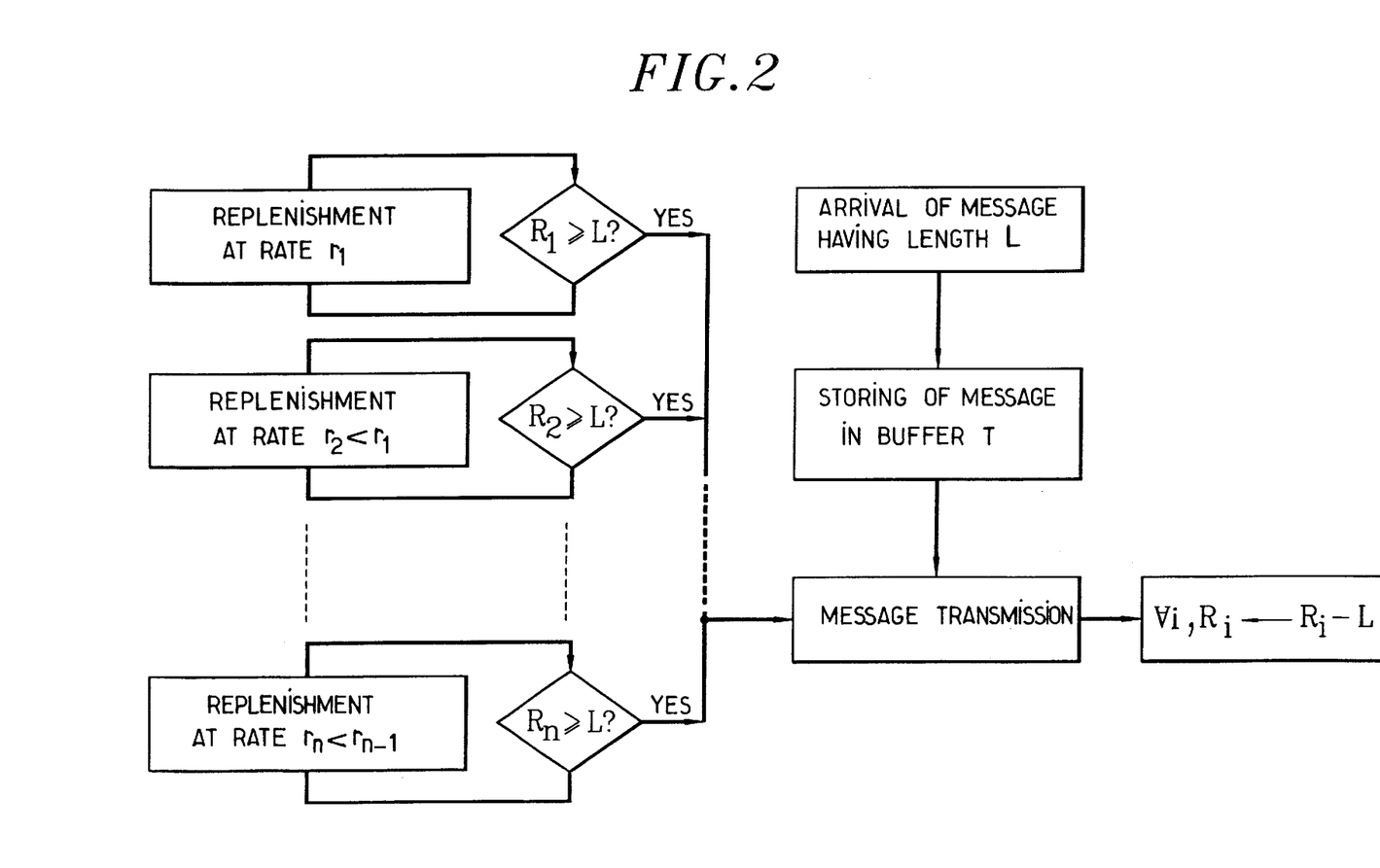
FIG. 2 is a flow chart showing how the method runs.

As can be seen in FIG. 2, when a message of length L seeks access to the network (a unit length being for instance equal to that of the shortest message that can travel over the network), said message is caused to wait in a FIFO access buffer so long as the buffer is not full, and otherwise the message is discarded. If the message can be stored, it is then sent over the network if and only if each reserve contains a number $R_i$ of tokens that is at least equal to L, in which case the reserve is decreased by L tokens. The algorithm for access to the network is thus as follows:

```
repeat
   if (R_1 and ... and R_n) ≥ L
   |   then send message
   |   for i = 1 to n
   |   |   R_1 ← Ri - L
   |   end for
   |   else nothing
   end if
end repeat
```

Having all n reserves is of interest only if, for all integers i in the range 1 to n−1, the durations:

$$\frac{M_i - M_{i-1}}{r_{i-1} - r_i}$$

with $M_0=0$ and $r_0=p$, where p is the peak transmission rate of the source, are all different, and if the following condition is satisfied:

$$\frac{M_1}{p - r_1} < \ldots < \frac{M_i - M_{i-1}}{r_{i-1} - r_i} < \ldots < \frac{M_n - M_{n-1}}{r_{n-1} - r_n}$$

If the source sends at transmission rate p constantly greater than $r_i$, then the reserves will empty progressively and $R_1$ will be the first reserve no longer to have a sufficient number of tokens. Following messages will then automatically be sent at the regulated transmission rate $r_1$, which is the replenishment rate for tokens in $R_1$. The other reserves will have a regulating effect if and only if their respective replenishment rates are strictly decreasing, i.e. $r_1 > \ldots > r_n$. Under such circumstances, the second reserve is emptied at the rate $r_1-r_2>0$. When it too is empty, messages are automatically sent at transmission rate $r_2$, and so on.

Figure 3:
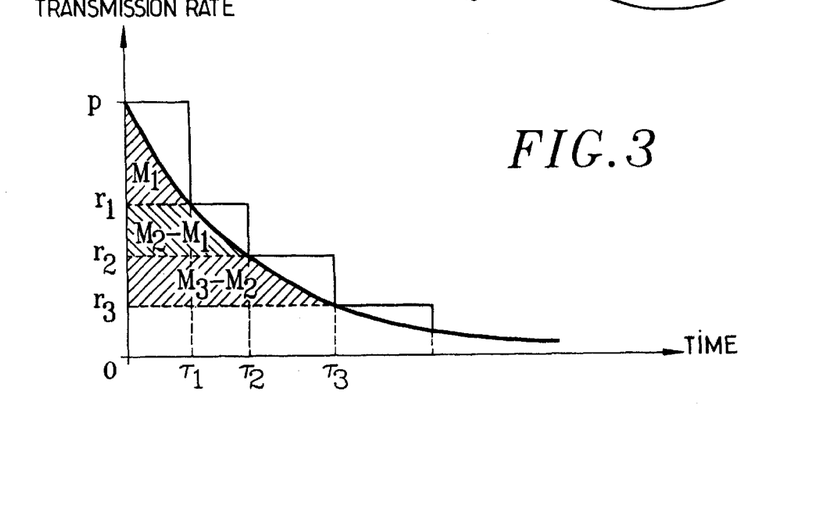
FIG. 3 is a graph of a function for smoothing the transmission rate of a source implementing the method of FIG. 2.

FIG. 3 shows an example of a function decreasing by steps, as obtained in this way and which shows the transmission rates at which messages are sent as a function of time, the figure also showing the associated smoothing curve.

In a first embodiment, the source presents fractal type traffic, i.e. traffic for which the relationship W for the volume of a burst can be approximated by a Pareto distribution with slow decrease in probability density given by $1/(W^{\gamma+1})$ where $\gamma$ is the smallest real positive integer such that the relationship W for the bursts possesses an infinite moment of order $\gamma$, i.e. $E(W^\gamma)=+\infty$, where the symbol E designates mathematical expectation. The fractal nature means that $\gamma$ lies in the range 1 to 2, which means that the burst relationship has a mean that is finite and variance that is infinite. The parameter $\gamma$ thus represents the exponent that is characteristic of the moments of the burst relationship. In such an embodiment, it is possible to use replenishment rates $r_i$ that decrease in arithmetic progression together with capacity values $M_i$ for the reserves which increase in geometric progression. In a variant, the replenishment rates $r_i$ may be chosen to decrease in geometric progression and the capacities $M_i$ to increase in arithmetic progession.

The number n of reserves is chosen as a function of the fineness of control it is desired to obtain. By way of concrete example, for a low transmission rate ($p \leq 128$ Kbit/s), it is possible to have two reserves with $\gamma=1.8$; for a medium transmission rate (128 Kbit/s$<p\leq 2$ Mbit/s), it is possible to select three reserves with $\gamma=1.6$; and for a high transmission rate (2 Mbit/s$<p\leq 34$ Mbit/s), four reserves could be selected with $\gamma=1.4$; and finally, for very high transmission rates ($p>34$ Mbit/s), it is possible to use four reserves with $\gamma=1.2$. Naturally, such a strategy can be modified depending on the particular situation of a network. In particular, the parameter $\gamma$ may fluctuate and depend on the source accessing the network.

It may be advantageous to select, for example, four reserves with four replenishment rates that decrease in arithmetic progression, i.e.:

$r_1=h$ $r_2=(2h+d)/3$ $r_3=(h+2d)/3$ $r_4=d$ where h and d are predetermined constants. The first reserve enables the peak transmission rate of the source to be regulated by limiting it to a desired value h with intrinsic burst tolerance (IBT) equal to $M_1$, while the following reserves serve to control the large volumes of bursts that are sent rather frequently by the source.

The capacities $M_i$ are chosen depending directly on the smoothing function it is desired to implement. In general, by taking:

$$M_i = \int_0^{\tau_i} [f(s) - f(\tau_i)]ds, \; r_i = f(\tau_i)$$

makes it possible to implement the smoothing function $r=f(\tau)$. The shaded areas in FIG. 3 represent respective values $M_1$, $M_2-M_1$, $M_3-M_2$. The instants $\tau_i$ can be selected freely, depending on the desired quality of regulation.

By way of concrete example, the values of $\tau_i$ can be selected so that the probability of the transmission rate being less than or equal to r is proportional to r, which corresponds to a uniformly distributed regulated transmission rate. For fractal traffic having a parameter $\gamma$ as defined above, and for no constraint on the value of $M_1$, this condition leads to the following formulae, in which the last reserve is constrained to have a capacity $M_n$ that is equal to the mean volume of a burst, and a replenishment rate $r_n$ equal to the mean transmission rate of the source, i.e. $r_n=vp$ where $v$ is the activity rate of the source: for all $i=1, \ldots, n$, $$r_i = \left[1 - \frac{i(1-\gamma)}{n}\right]p$$

and $$M_i = M_n \left[\frac{\frac{(r_1)^{(1/\gamma)}}{r_i} + \frac{1}{\gamma}\frac{r_i}{r_1} - \left(1 + \frac{1}{\gamma}\right)\frac{r_i}{p}}{\frac{(r_1)^{(1/\gamma)}}{r_n} + \frac{1}{\gamma}\frac{r_n}{r_1} - \left(1 + \frac{1}{\gamma}\right)\frac{r_n}{p}}\right]$$

If there exists intrinsic burst tolerance equal to $M_1$, then, still by way of concrete example, it is possible to use $r_1=h$ where h is the solution to the following equation:

$$\frac{(h)^{(1/\gamma)}}{r_n} + \frac{1}{\gamma}\frac{r_n}{h} - \left(1 + \frac{1}{\gamma}\right)\frac{r_n}{p} = \left(1 + \frac{1}{\gamma}\right)\left(1 - \frac{h}{p}\right)\frac{M_n}{M_1}$$

and, for all i=2, ..., n, $$r_i = h - \frac{(i-1)(h-vp)}{n-1}$$

and $$M_i = M_n \left[ \frac{\frac{(h)^{(1/\gamma)}}{r_i} + \frac{1}{\gamma}\frac{r_i}{h} - \left(1+\frac{1}{\gamma}\right)\frac{r_i}{p}}{\frac{(h)^{(1/\gamma)}}{r_n} + \frac{1}{\gamma}\frac{r_n}{h} - \left(1+\frac{1}{\gamma}\right)\frac{r_n}{p}} \right]$$

In the first case, i.e. without any intrinsic burst tolerance constraints, for a source having a peak transmission rate p=10 Mbit/s, an activity rate v=4% and a mean burst volume Mn=100 Kbit, and for γ=1.4, the following apply:

| | |
|---|---|
| $r_1$ = 7.6 Mbit | $M_1$ = 5 Kbit |
| $r_2$ = 5.2 Mbit/s | $M_2$ = 11.1 Kbit |
| $r_3$ = 2.8 Mbit/s | $M_3$ = 22.3 Kbit |
| $r_4$ = 0.4 Mbit/s | $M_4$ = 100 Kbit |

Under the same conditions but with an activity rate v=15%, the following apply:

| | |
|---|---|
| $r_1$ = 7.9 Mbit | $M_1$ = 11.6 Kbit |
| $r_2$ = 5.7 Mbit/s | $M_2$ = 25 Kbit |
| $r_3$ = 3.6 Mbit/s | $M_3$ = 46 Kbit |
| $r_4$ = 1.5 Mbit/s | $M_4$ = 100 Kbit |

The specific values selected for the capacities of the reserves and for their replenishment rates make it possible to measure effectively the behavior of a controlled source by using the method of the invention. In the example above, where the source has fractal type traffic of parameter γ, it suffices to establish a time series as obtained by observation, at predetermined instants, of the effective transmission rates at which cells are sent (transmission rate $r_i$ if the ith reserve is exhausted, but not the (i+1)th) in order to monitor statistically whether said series is uniformly distributed over all of the possible non-zero transmission rates, which would mean that the source does indeed have fractal type behavior of parameter γ. If the result of the measurements does not give uniform distribution, then it is necessary to begin again with some other value for the parameter γ, until uniform distribution is obtained.

Such steps of monitoring the behavior of the source are applicable in more general manner to any type of behavior defined by a model that is characterized by at least one parameter.

First, the model is defined. Then the rate at which cells are sent is measured, at predetermined instants.

Then a verification is made whether the time series of measured transmission rates satisfies the defined model. If not, the parameter which characterizes the model is modified and the steps of measuring and verifying the fit of the measurements to the model are reiterated, until a fit is obtained.

The present invention is adaptable to a very wide variety of traffic, and it is applicable to numerous types of broadband multiservice networks (particularly broadband ISDN), to interconnecting local networks, and in particular to ATM and frame relay networks.

I claim:

1. A method for accepting data messages originating from a plurality of sources and each consisting of cells, and for admitting said messages into a digital telecommunications network, said method comprising the following steps, for each one of the sources, which has a predetermined peak transmission rate p:

(a) allocating to said one of the sources a predetermined number n, n being an integer greater than 1, of reserves of tokens, each token representing a time duration which is a fraction of a cell duration, and each of said reserves having a respective determined capacity of tokens $M_1, \ldots, M_i, \ldots, M_n$;

(b) replenishing said reserves at respective predetermined rates $r_1, \ldots, r_i, \ldots, r_n$ with $r_1 > \ldots > r_i > \ldots > r_n$ and such that:

$$\frac{M_1}{p-r_1} < \ldots < \frac{M_i - M_{i-1}}{r_{i-1} - r_i} < \ldots < \frac{M_n - M_{n-1}}{r_{n-1} - r_n},$$

i.e.

$$\frac{M_i - M_{i-1}}{r_{i-1} - r_i} < \frac{M_{i+1} - M_i}{r_i - r_{i+1}}$$

for all integers i lying in the range 1 to n−1, with $M_0$=0 and $r_0$=p;

(c) storing the cells originating from said one of the sources in a FIFO access buffer memory;

(d) sending at least a first cell of a stored message from said access buffer memory as soon as each of said reserves contains a number of tokens that is at least equal to a length of said cell, at a first transmission rate, and simultaneously decreasing all said reserves by a number of tokens that corresponds to the length of said cell;

(e) once a first one of said reserves of capacity $M_1$, is exhausted, continuing to send cells of said stored message automatically at a second transmission rate lower than the first transmission rate and equal to said rate $r_1$ of replenishment of said first one of said reserves until the second reserve is exhausted; and (f) continuing to send cells of said stored message automatically at successive decreasing transmission rates respectively equal to said replenishment rates $r_2, \ldots, r_n$.

2. A method according to claim 1, wherein said first transmission rate is equal to a maximum value corresponding to a bandwidth of said network.

3. A method according to claim 1, wherein said replenishment rates $r_1, \ldots, r_n$ have values which decrease in arithmetic progression and said token capacities $M_1, \ldots, M_n$ have values which increase in geometric progression.

4. A method according to claim 1, wherein said replenishment rates $r_1, \ldots, r_n$ have values which decrease in geometric progression and said token capacities $M_1, \ldots, M_n$ have values which increase in arithmetic progression.

5. A method according to claim 3, wherein n=4, and said decreasing arithmetic progression has a first term h and a difference (d−h)/3, with d<h, where h and d are predetermined constants, whereby:

$r_1$=h
$r_2$=(2h+d)/3
$r_3$=(h+2d)/3

$r_4=d$.

6. A method according to claim 1, wherein all said messages comprise cells having a fixed length and said network is an ATM type network.

7. A method according to claim 1, wherein said messages comprise packets of varying length and said network is a frame relay type network.

8. A method according to claim 1, further comprising the steps of:

(g) defining a theoretical behavior for said one of the sources by means of a model including at least one parameter;

(h) measuring, at predetermined instants, effective transmission rates at which cells are received from said one of the sources;

(i) checking whether a time series of said measured effective transmission rates is in conformity with said theoretical behavior, and, as long as it is not, (j) modifying said parameter and repeating steps (g)–(i).

9. A method according to claim 8, wherein said theoretical behavior of the source is a fractal type behavior.

10. An apparatus for accepting data messages originating from a plurality of sources and each consisting of cells, and for admitting said messages into a digital telecommunications network, said apparatus comprising, for each one of the sources, which has a predetermined peak transmission rate p:

a buffer memory for access to said network, said access buffer memory being a FIFO access buffer memory and having an inlet which is connected to said one of the sources;

a predetermined number n, n being an integer lying in the range 2 to 6, of reserves of tokens having respective determined token capacities $M_1, \ldots, M_i, \ldots, M_n$;

means for replenishing said reserves at respective predetermined rates $r_1, \ldots, r_i, \ldots, r_n$ with $r_1 > \ldots > r_i > \ldots > r_n$; and means responsive to a presence of at least one cell in said access buffer memory for determining whether each of said reserves contains a number of tokens that is at least equal to a length of said cell, for authorizing access by a first cell of a message stored in said buffer memory to said network at a first transmission rate controlled by said network, while decrementing all said reserves by a number of tokens equal to the length of said cell, and then for sending subsequent cells at transmission rates respectively equal to said successive replenishment rates $r_1, \ldots, r_n$ as the reserves are exhausted.

* * * * *

UNITED STATES PATENT AND TRADEMARK OFFICE
CERTIFICATE OF CORRECTION

PATENT NO. : 5,815,491
DATED : September 29, 1998
INVENTOR(S) : GUIBERT

It is certified that error appears in the above-indentified patent and that said Letters Patent is hereby corrected as shown below:

Column 3, line 14, change "data n" to -- data in --.

Column 4, line 5, change ",R ..." to -- ,$R_i$, ... --.

Column 4, the formula between lines 55-60,
    the third line of text, change "$R_l$" to --$R_i$ --;
    the fourth line of text, change "$F_i \leftarrow R_l$" to -- $R_i \leftarrow R_i$ --.

Column 5, delete the formula between lines 7 and 15, and insert the following formula therefor:

--
```
repeat
|      if (R₁ and ... and Rₙ) ≥ L
|      |      then send message
|      |      |      for i = 1 to n
|      |      |      |   Rᵢ ← Rᵢ - L
|      |      |      end for
|      |      else nothing
|      end if
end repeat
```
--.

UNITED STATES PATENT AND TRADEMARK OFFICE
CERTIFICATE OF CORRECTION

PATENT NO. : 5,815,491  Page 2 of 3
DATED      : September 29, 1998
INVENTOR(S): GUIBERT It is certified that error appears in the above-indentified patent and that said Letters Patent is hereby corrected as shown below:

Column 6, line 30, in the center of the equation, change "f($\tau_i$)" to -- f($\tau_1$) --.

Column 6, line 46, change "vp where v" to -- $v$p where $v$ --.

Column 6, lines 53-57, please delete the formula in its entirety and replace it with the following equation:

--

$$M_i = M_n \left[ \frac{\left(\frac{r_1}{r_i}\right)^{(1/\gamma)} + \frac{1}{\gamma}\frac{r_i}{r_1} - \left(1+\frac{1}{\gamma}\right)\frac{r_i}{p}}{\left(\frac{r_1}{r_n}\right)^{(1/\gamma)} + \frac{1}{\gamma}\frac{r_n}{r_1} - \left(1+\frac{1}{\gamma}\right)\frac{r_n}{p}} \right]$$

--.

Column 6, lines 64-66, please delete the formula in its entirety and replace it with the following equation:

--

$$\left(\frac{h}{r_n}\right)^{(1/\gamma)} + \frac{1}{\gamma}\frac{r_n}{h} - \left(1+\frac{1}{\gamma}\right)\frac{r_n}{p} = \left(1+\frac{1}{\gamma}\right)\left(1-\frac{h}{p}\right)\frac{M_n}{M_1}$$

--.

UNITED STATES PATENT AND TRADEMARK OFFICE
CERTIFICATE OF CORRECTION

PATENT NO. : 5,815,491
DATED : September 29, 1998
INVENTOR(S) : GUIBERT

It is certified that error appears in the above-indentified patent and that said Letters Patent is hereby corrected as shown below:

Column 7, lines 5-10, please delete the formula in its entirety and replace it with the following equation:

$$-- \quad M_i = M_n \frac{\left[\left(\dfrac{h}{r_i}\right)^{(1/\gamma)} + \dfrac{1}{\gamma}\dfrac{r_i}{h} - \left(1+\dfrac{1}{\gamma}\right)\dfrac{r_i}{p}\right]}{\left[\left(\dfrac{h}{r_n}\right)^{(1/\gamma)} + \dfrac{1}{\gamma}\dfrac{r_n}{h} - \left(1+\dfrac{1}{\gamma}\right)\dfrac{r_n}{p}\right]} \quad --.$$

Column 7, line 14, change "v=4%" to -- $v=4\%$ --.

Column 7, line 15, change "Mn" to -- $M_n$ --.

Column 7, line 24, change "v=15%" to -- $v=15\%$ --.

Column 8, line 38, after "reserves" insert -- , --.

Signed and Sealed this

Fifteenth Day of June, 1999

Attest:

Q. TODD DICKINSON

*Attesting Officer*    Acting Commissioner of Patents and Trademarks